INVENTORS
LEONARD R. PHILLIPS, WILLIAM J. WAELDNER
CARL W. PALMQUIST, RAYMOND S. BARLOW
BY Teller, McCormick, Paulding & Huber
ATTORNEYS

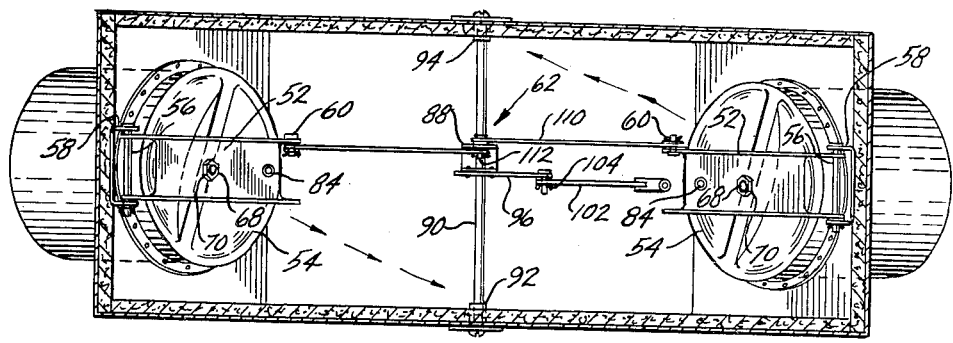
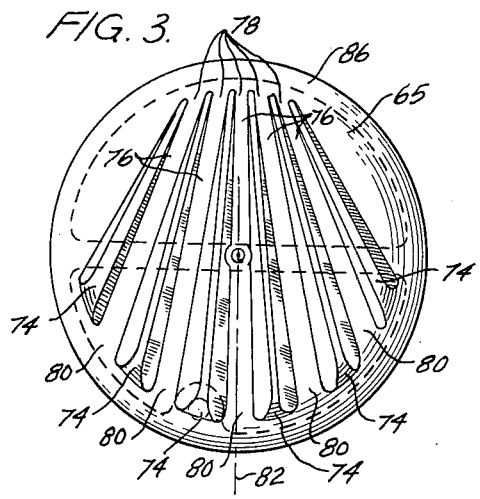
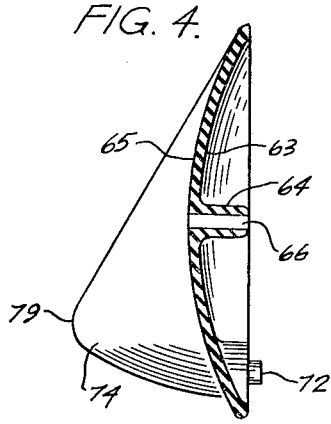
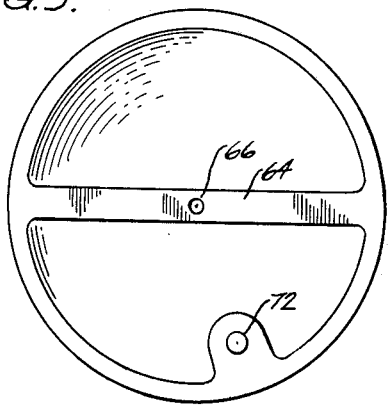

United States Patent Office 3,211,177
Patented Oct. 12, 1965

3,211,177
VALVE MEANS IN AIR DISTRIBUTION
APPARATUS
Leonard R. Phillips, New York, N.Y., and William J. Waeldner, Waverly, Carl W. Palmquist, Newton, and Raymond S. Barlow, Dalton, Pa., assignors, by mesne assignments, to Dynamics Corporation of America, New York, N.Y., a corporation of New York
Original application Jan. 27, 1960, Ser. No. 5,028, now Patent No. 3,084,711, dated Apr. 9, 1963. Divided and this application Oct. 30, 1962, Ser. No. 234,169
5 Claims. (Cl. 137—604)

This invention relates to air conditioning systems and, more particularly, to valve means in apparatus adapted for use in high pressure or high velocity air distribution systems of the type currently utilized in increasing numbers with central air conditioning units. The present application is a division of the copending application of Leonard R. Phillips, William J. Waeldner, Carl W. Palmquist and Raymond S. Barlow, Serial No. 5,028, filed January 27, 1960, and entitled "Air Distribution Apparatus", now Patent No. 3,084,711 issued April 9, 1963.

High pressure or high velocity air distribution systems are characterized by air ducts of comparatively small size and have, to a large extent, solved space problems encountered with the older and more conventional low pressure or low velocity air distribution systems which are characterized by relatively large air ducts. The use of high pressure or high velocity distribution systems has, however, introduced a number of new problems which have not been fully overcome. Since conditioned air discharged directly to a room or other enclosure at a high velocity may tend to create drafts which are objectionable or even harmful to occupants, it is desirable and in some instances essential, that a reduction in air velocity be effected prior to discharge. Such reduction in air velocity may be accompanied by audible and even distracting noise and it is therefore advantageous to provide for velocity reduction at as low a noise level as possible and, in addition, to provide means for attenuating the low level noise that is encountered.

Further, where the distribution system comprises both hot and cold air ducts and supplies a number of rooms or other enclosures with conditioned air from these ducts at selected and possibly different temperatures, the conditioned air emerging at each discharge point must be drawn in selected proportion from the hot and cold air ducts and thoroughly mixed prior to discharge. Thorough mixing of the hot and cold air is essential in avoiding extreme temperature differentials in adjacent air zones or streams in a room or enclosure and may obviously be somewhat more difficult of accomplishment under conditions of comparatively high pressure and velocity than in the aforementioned older distribution systems where air pressures and velocities are generally lower.

A principal object of the present invention is to provide air proportioning valves adapted to regulate the relative amounts of hot and cold air discharged to a room or other enclosure, to effect a low noise level reduction in the velocity and pressure of the hot and cold air admitted to the apparatus from the distribution system ducts, and to provide for more efficient mixing of the hot and cold air than has heretofore been achieved.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:
FIG. 1 is a front elevational view of an apparatus embodying the present invention in a unitary assembly with the front wall or cover plate of the assembly housing removed.

FIG. 2 is a horizontal sectional view taken as indicated by the line 2—2 in FIG. 1 and showing hot and cold air proportioning valves of the invention and a linkage system associated therewith.

FIG. 3 is an enlarged front elevational view of one of the proportioning valves of FIG. 2.

FIG. 4 is an enlarged view of the valve in side elevation.

FIG. 5 is an enlarged view of the valve in back elevation.

Figure 1:
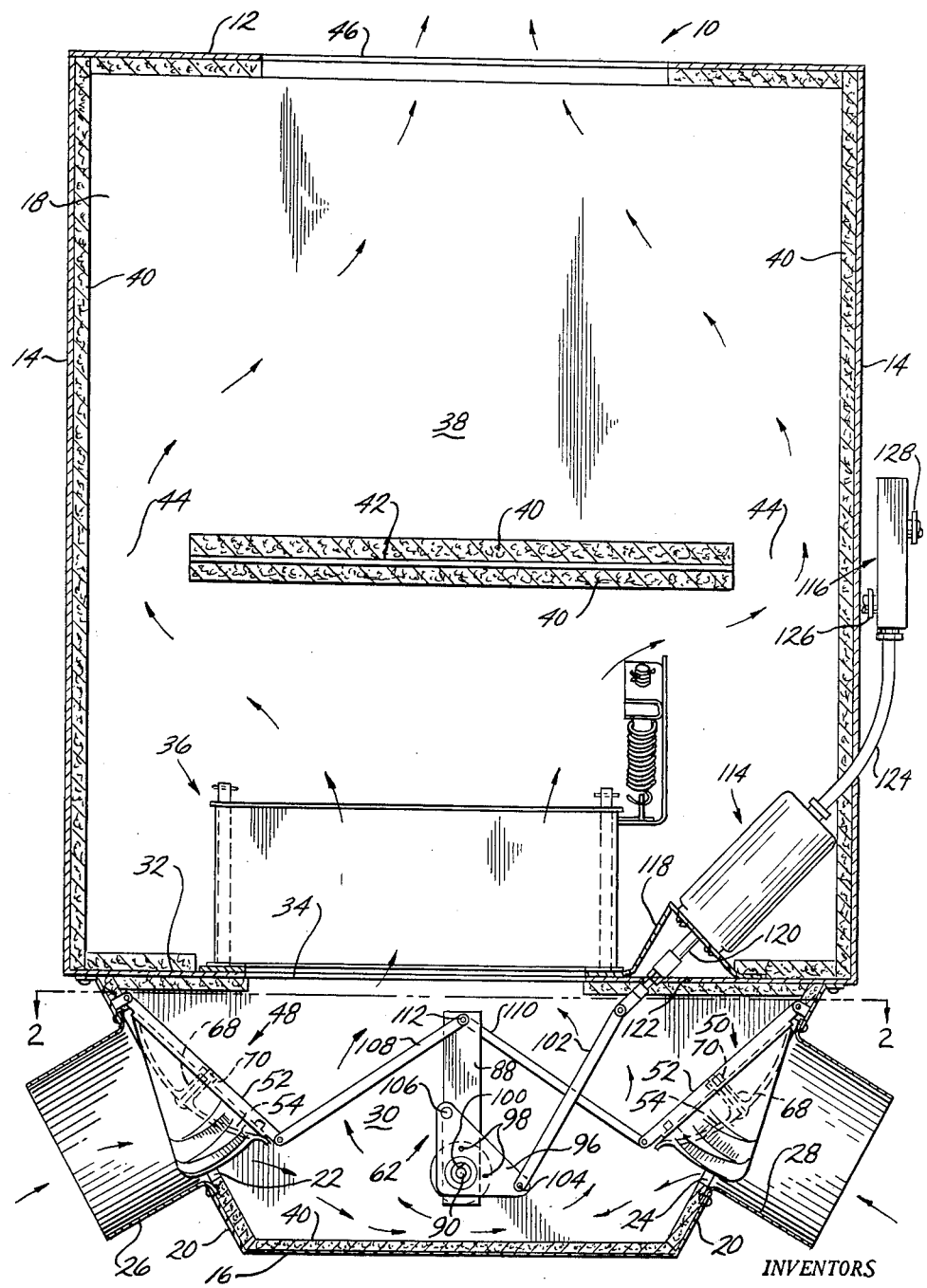

Referring particularly to FIG. 1 of the drawings, it will be observed that in the illustrative embodiment of the invention shown an air distribution apparatus takes the form of a unitary assembly comprising a thin-walled housing indicated generally by the reference numeral 10. The housing 10 may be constructed of sheet metal or other relatively thin members and includes a top wall 12, similar oppositely facing side walls 14, 14, a bottom wall 16, and similar front and back walls 18, 18, the front wall being removed in FIG. 1 to show the elements of the apparatus which are located within the housing. Lower portions 20, 20 of each of the side walls 14, 14 are angularly disposed with respect to the upper portions thereof and with respect to each other and said portions are shown as diverging upwardly. This specific construction and arrangement of the side walls 14, 14 is not an essential feature of the invention but is preferred for reasons to be set forth hereinafter.

Similar first and second inlet openings 22 and 24, preferably of circular configuration, are provided respectively in the lower portions 20, 20 of the opposing side walls 14, 14 and said openings are connectible respectively with hot and cold air supply ducts of a high pressure or high velocity air distribution system incorporating the distribution apparatus. Tubular flanges or collars 26 and 28 are provided adjacent the first and second or hot and cold air inlet openings 22 and 24 respectively for convenient attachment of such hot and cold air supply ducts. As shown, the axes of the inlet openings 22 and 24 and their tubular flanges or collars intersect at a point within the housing 10. Thus, streams of hot and cold air introduced to the interior of the housing through the said inlet openings will tend to collide and cause turbulent air flow therein. The provision of inlet openings which tend to cause collision and turbulence of inflowing hot and cold air streams is optional as will be seen.

The lower portion of the interior of the housing 10 into which the hot and cold air flows from the inlet openings 22 and 24 serves as an inlet or mixing chamber 30, hot and cold air being thoroughly comingled therein. Said chamber has a bottom wall formed by the housing bottom wall 16, opposing side walls formed by the upwardly diverging lower portions 20, 20 of the housing side walls 14, 14, front and rear walls formed by the lower portions of the housing front and rear walls 18, 18, and a top wall formed by a partition 32 extending across the interior of the housing. The partition 32 is provided with an air passageway or air opening 34 through which mixed hot and cold air is discharged from the inlet or mixing chamber 30. Associated with said air passageway or discharge opening 34 is a flow control device indicated generally at 36 and which operates to maintain a substantially constant flow of air through said passageway or opening and through the distribution apparatus. The said flow control device forms no essential part of the present invention.

Mixed hot and cold air discharged from the flow control device 36 enters a chamber 38 defined by and within the housing 10 and by and above the partition 32. The chamber 38 is substantially larger than the aforementioned mixing chamber 30 and the walls thereof are lined with pads or sheets 40, 40 of suitable sound absorbing or sound deadening material such as felted or matter glass fiber. Thus, substantial sound attenuation is accomplished therein and the chamber 38 may appropriately be termed an "attenuation chamber". Further provision for sound attenuation is made in the said chamber in the form of a baffle plate 42 which extends transversely in the path of incoming air from the flow control device 36 and which is also provided with pads or sheets 40, 40 of sound absorbing or sound deadening material. Preferably and as shown, the aforementioned walls of the inlet or mixing chamber 30 are also lined with pads or sheets 40, 40 of sound absorbing or sound deadening material.

From the foregoing, it will be apparent that noise accompanying the flow of hot and cold air into and through the mixing chamber 30 and the flow control device 36 will be attenuated in both the mixing chamber 30 and the attenuation chamber 38. The mixed hot and cold air entering the attenuation chamber 38 from the flow control device 36 will be directed transversely in the said chamber in two branch streams toward the opposite side walls thereof by the baffle plate 42. Said two streams of air flow respectively through two openings 44, 44 adjacent the ends of said plate. Discharge of the air from the attenuation chamber may be provided for as by a suitable discharge opening 46 formed in the aforementioned top wall 12 of the housing 10. By reason of the substantial size of the attenuation chamber with respect to the mixing chamber 30, a substantial reduction in air velocity is also effected in said attenuation chamber. In addition, there may obviously be substantial additional mixing and comingling of the hot and cold air in the said chamber.

In accordance with conventional practice, the air which emerges from the distribution apparatus through the discharge opening 46 may be passed through a diffuser prior to delivery to a room or other enclosure requiring conditioned air. Such a diffuser may include provisions for the induction of room or enclosure air, as is well known in the art, and may be disposed immediately adjacent the discharge opening 46 so as to receive air directly therefrom or, in the alternative, a remote location of the diffuser may be provided for by means of suitable ducts. The provision of means for diffusing conditioned air delivered to a room or other enclosure, as well as the provision of air induction means and associated air ducts and the like, is only incidental to the present invention and therefore no showing or detailed description of such means is deemed necessary.

In accordance with the present invention and in fulfillment of its above-mentioned principal object, air proportioning valves are provided for regulating the relative amounts of hot and cold air discharge to a room or other enclosure. In the distribution apparatus shown and described above, the inlet or mixing chamber 30 serves also as a valve chamber and has disposed therein first and second air proportioning valves indicated generally by the reference numerals 48 and 50 respectively. The valves 48 and 50 are operatively associated respectively with the first or hot air inlet opening 22 and the second or cold air inlet opening 24 and said valves are adapted to regulate the relative amounts of hot and cold air flowing through said inlet openings into the mixing chamber 30. As will be explained more fully hereinbelow, the valves 48 and 50 effect a low noise level reduction in the velocity of hot and cold air entering the mixing chamber from the inlet openings 22 and 24 and provide for highly efficient mixing of hot and cold air streams in the said chamber.

Preferably and as shown, the valves 48 and 50 are of like construction and each comprises a valve support member 52 and a valve member 54 adapted to be mounted thereon. The valve support members 52, 52 are pivotally supported at their upper end portions respectively adjacent the inlet openings 22 and 24 by suitable pivot pins 56, 56. Supporting brackets 58, 58 for the pivot pins 56, 56 are secured to the lower portions 20, 20 of the housing side walls 14, 14 adjacent the inlet openings 22 and 24. At its lower end portion each of the valve support members 52, 52 is provided with a pivot pin 60. Thus, said members are each adapted to be pivotally connected with a linkage means indicated generally at 62. It will be seen that the valve support members 52, 52 may be swung about their respective pivot pins 56, 56, as by the linkage means 62, whereby to be moved toward and away from their respective inlet openings and to impart similar movements to valve members 54, 54 mounted thereon for closing and opening said inlet openings and regulating air flow therethrough.

When the inlet openings 22 and 24 are of circular configuration as shown, the valve members 54, 54 are preferably circular or, more specifically, disc shaped as illustrated in FIGS. 3, 4 and 5 wherein a single valve member 54 is shown in detail. As best shown in FIGS. 4 and 5, an inner or concave face 63 of each valve member 54 is provided with an integral rib 64 which extends across said face and projects outwardly to the plane of the peripheral portion thereof. An axial bore 66 at the center of each valve member 54 and its integral rib extends through the member and is adapted to receive a bolt 68 (FIGS. 1 and 2) which can be entered in a suitable bore in a valve support member 52 and engaged with a nut 70 to securely mount the valve member on the support member. There is also provided on the inner or concave face 63 of each valve member 54, an integral locating pin 72 which is disposed adjacent the aforesaid peripheral portion thereof and which projects beyond the plane of said portion. The function of the pin 72 will be set forth hereinbelow.

Referring now to an outer or convex face 65 of the valve member 54, it will be observed that a plurality of similar fins 74, 74 are formed integrally thereon. The face 65 of the valve member is engaged at an angle by the stream of air flowing into the mixing chamber 30 when the valve member is mounted on its support member 52 and is disposed in an open position and the fins 74, 74 provided thereon serve to direct and otherwise treat the said air stream in a desired manner. That is, the fins 74, 74 serve to broaden and flatten the air stream flowing thereby so that it assumes a fan pattern and they also serve to direct the fan pattern along a selected path. As shown, the outer or convex valve member face 65 is provided with six similar fins 74, 74 arranged in a fan pattern and which define five air channels 76, 76 also arranged in a fan pattern. The air channels 76, 76 have air inlet ends 78, 78 relatively closely spaced with respect to each other and air outlet or discharge ends 80, 80 spaced substantially farther apart. The fins 74, 74 are generally triangular in shape and their outer edges slope gradually outwardly from the outer or convex face of the valve member adjacent the inlet ends 78, 78 of the air channels 76, 76. From rounded apexes 79, 79 the said edges of the fins slope sharply inwardly to the outlet or discharge ends 80, 80 of said channels. Thus, the depth of the air channels 76, 76 increases gradually and then decreases sharply in the direction of air flow therethrough.

From the foregoing, it will be apparent that a stream of air angularly engaging and passing over the outer or convex face of a valve member 54 will enter the air channels 76, 76 and will be broadened and flattened on discharge from said channels and will enter the mixing chamber in a fan pattern. It will be further apparent that the air discharged from the valve member in a fan pattern will have a general direction of flow determined by a center line 82 of the fan pattern formed by the fins 74, 74.

In further accord with the present invention, provision is made for directing streams of hot and cold air into the mixing chamber 30 in such manner that said streams of air whirl within the chamber in side-by-side relationship but in opposite directions, it being found that superior mixing of the hot and cold air is thus achieved. The desired whirling air flow patterns may obviously be obtained with various constructions and arrangements of hot and cold air inlet openings and associated proportioning valves, and such constructions and arrangements of valves and inlet openings fall within the scope of the invention. It is presently the preferred practice, however, to provide inlet openings with intersecting axes as shown and to effect a change in direction in the air streams flowing therethrough by means of the associated proportioning valves whereby to avoid collision of the air streams and to instead achieve the desired whirling air flow pattern. With the valve member construction shown, the required changes in the direction of air flow may be effected by angular adjustments of the valve members and the center lines 82, 82 of the fins 74, 74 thereon as will be presently described.

In mounting the valve members 54, 54 on their respective support members 52, 52, the aforementioned locating pins 72, 72 on the said members are entered in locating holes 84, 84 (FIG. 2) formed in said valve support members to effect the angular adjustments of the valve member center lines 82, 82 required to achieve the desired whirling support members 52, 52, the aforementioned locating pins 72, 72 on the said members are entered in locating holes 84, 84 (FIG. 2) formed in said valve support members to effect the angular adjustments of the valve member center lines 82, 82 required to achieve the desired whirling air flow pattern in the mixing chamber 30. Referring again to FIG. 5, it will be observed that the locating pin 72 on the valve member 54 shown therein is offset with respect to the center line 82 of the fins 74, 74. On the other hand, and as best illustrated in FIG. 2, the locating holes 84, 84 in the valve support members 52, 52 are disposed directly beneath the bores in said members which receive the securing bolts 68, 68 and said holes would fall on the valve center lines if the valve members were secured to the support members in the attitudes shown in FIG. 3. Thus, the valve members 54, 54 must be rotated through a selected angle (in a counterclockwise direction as viewed from outside the inlet openings 22 and 24) in mounting the said members on their respective support members 52, 52. Such rotation of the valve members effects angular adjustments of the center lines 82, 82 of the fan patterns formed by their fins 74, 74 whereby the fins on one of said valve members is angularly related with respect to the corresponding fins on the other valve member so as to provide for the desired side-by-side whirling air streams in the mixing chamber 30.

In FIGS. 1 and 2, wherein the valve members 54, 54 are shown mounted on their respective support members 52, 52 and wherein said valve members are in partially open positions, the air flow pattern in the mixing chamber 30 is illustrated generally by arrows representing the center lines of the fan pattern formed by the air on discharge from the valve members. Thus, it will be seen that the hot air stream is directed in a fan pattern by the fins 74, 74 on the valve member 54 associated with the hot air inlet opening 22 downwardly and rearwardly in the mixing chamber 30. The corresponding cold air stream is directed in a fan pattern downwardly and forwardly in said chamber by the fins 74, 74 on the valve member 54 associated with the cold air inlet opening 24. Thus, the hot air stream whirls in a vertical path in a rear portion of the mixing chamber and in a clockwise direction as viewed in FIG. 1, while the cold air stream whirls similarly and adjacent the hot air stream but in a counterclockwise direction in a front portion of said chamber. The aforementioned preference for mixing chamber side walls which diverge upwardly, such as the walls 20, 20, can now be appreciated, it being apparent that the said walls are conducive to the desired side-by-side vertically whirling air flow pattern.

From the foregoing, it will be apparent that side-by-side whirling hot and cold air streams will be present in the mixing chamber 30 with resulting thorough mixing of hot and cold air whenever both valve members 54, 54 are in open positions with respect to their associated inlet openings. Discharge of the air from the air channels 76, 76 on the valve members 54, 54 in a fan pattern serves to enhance mixing of the air in the mixing chamber. That is, the broadening and flattening of the air streams passing the valve members into fan patterns entails a loss of forward energy and a reduction in the velocity of the air and this is of course conducive to thorough mixing in the chamber. Further, it is to be noted that the localized impingement of high velocity air streams or jets on the bottom or front and back walls of the mixing chamber is avoided. This results in a substantial reduction in the tendency of the air to generate noise in the mixing chamber and air velocity reduction is accomplished at a desirably low noise level.

Each of the valve members 54, 54 is movable from a fully open to a fully closed position and to a number of discrete positions therebetween by appropriate swinging movements of their supporting members 52, 52 as will be described hereinbelow. In their fully closed positions, the valve members 54, 54 are adapted for substantially airtight sealing engagement with the portions of the mixing chamber side walls 20, 20 adjacent the hot and cold air inlet openings 22 and 24, and such sealing is preferably accomplished without the use of separate sealing elements. That is, each valve member 54 is preferably formed of a rubberlike or plastic compound having characteristics suitable for substantially airtight sealing and a relatively smooth peripheral portion 86 (FIG. 3) of the outer or convex face thereof lying beyond the ends of the fins 74, 74 is adapted to tightly engage the portion of the mixing chamber side wall adjacent the inlet opening whereby to provide a substantially airtight seal.

The aforementioned linkage means 62 is adapted to effect swinging movements of the valve support members 52, 52 about their respective pivots toward and away from their associated inlet openings whereby to respectively effect closing and opening movements of the valve members 54, 54, said valve movements being in unison but in opposite directions. As best illustrated in FIGS. 1 and 2, the linkage means 62 comprises, in presently preferred form, an input member in the form of a two-part bell crank which may be moved in one and an opposite direction or, more specifically, which may be rotated in opposite directions to actuate the linkage means, the valve support members 52, 52, and the valve members 54, 54. A first part 88 of the bell crank is shown as being generally U-shaped with arms of unequal length which are provided near their connected ends with aligned circular openings which receive a pivot pin 90. The pin 90 is journaled at opposite ends in suitable bearings 92 and 94 which are mounted respectively on the front and back housing walls 18, 18. A second part of the bell crank comprises a flat generally triangular plate 96 which is fixedly secured to the shorter arm of the first part 88 the crank as by suitable rivets 98, 98. The pivot pin 90 is received in a suitable opening 100 in the plate 96 and said plate is pivotally connected adjacent one corner thereof with one end of a driving link 102 by means of a suitable pivot pin 104. An opening 106 formed in a corner of the plate 96 diagonally opposite the aforementioned corner may be utilized in pivotally connecting the driving link 102 with the said plate in an alternative manner and for a purpose to be set forth hereinafter.

The linkage means 62 also includes first and second connecting links 108 and 110 each of which is pivotally connected with and driven by the first part 88 of the bell crank. That is, the longer arm of the crank part 88 is pivotally connected adjacent its free end with one end of each of the connecting links 108 and 110 by a suitable pivot pin 112. The opposite ends of said connecting links are pivotally connected respectively with the aforementioned pivot pins 60, 60 adjacent the lower end portions of the valve support members 52, 52.

From the foregoing, it will be apparent that reciprocable or push-pull movements of the driving link 102 may be effected generally along the longitudinal center line of said link to respectively impart clockwise and counterclockwise rotative movements to the bell crank comprising the parts 88 and 96. Clockwise rotation of the bell crank resulting from a pushing movement of the link 102 will obviously effect an opening movement of the valve member 54 associated with the hot air inlet opening 22 and a simultaneous and equal closing movement of the valve member 54 associated with the cold air inlet opening 24. Pulling movement or retraction of the driving link 102 and resulting counterclockwise rotation of the bell crank will have a similar effect but linkage and valve member movements will of course be in an opposite direction. Thus, it will be seen that the relative amounts of hot and cold air introduced to the mixing chamber 30 and the temperature of the air discharged by the distribution apparatus may be regulated by appropriate push-pull actuation of the driving link 102.

The function and purpose of the aforementioned opening 106 in the bell crank plate 96 may now be more readily understood. With the driving link 102 pivotally connected to the said plate by insertion of the pivot pin 104 in the opening 106, and the said driving link actuated as indicated above, the valve members 54, 54 will be moved in unison but in opposite directions as described above but the operation of the linkage means will be reversed. That is, a pushing movement or a partial forward stroke of the driving link 102 will result in a closing movement of the valve member 54 associated with the hot air inlet opening 22 and in a simultaneous and equal opening movement of the valve member 54 associated with the cold air inlet opening 24. A pulling or retracting movement of the driving link will of course result in movement of the respective valve members in opposite directions. Obviously, the flexibility of the linkage means is enhanced in providing for two alternative modes of valve operation and the incorporation of the distribution apparatus in various air distribution systems is facilitated. For example, it may be desirable in one distribution systems to have the hot air inlet opening 22 closed and the cold air inlet opening 24 open when the system is inoperative and the driving link 102 is at rest. In another distribution system, reverse conditions of the inlet openings may be desirable when the system is inoperative. Either set of conditions may be conveniently provided for with the linkage means 62 described above.

Automatic control of the temperature of the air discharged by the distribution apparatus is preferably provided for and, in the illustrative embodiment of the invention shown, automatic temperature responsive operation of the linkage means 62 and the valve members 54, 54 is accomplished by means of an actuator indicated generally at 114 and a thermostat indicated generally at 116. Any number of commercially available types of actuators may be utilized, the actuator 114 shown being of the well known pneumatically operable type and requiring no detailed description. The said actuator is supported in the attenuation chamber 38 by means of a suitable bracket 118 and has a reciprocable output member or piston rod 120 which extends through an opening 122 in the partition 32 and which is pivotally connected with the aforementioned driving link 102. It will be apparent that the actuator may be reciprocally operated so that its piston rod 120 will actuate the driving link 102 by regulating air pressure in a control conduit 124 connected with the actuator.

The thermostat 116, also connected with the control conduit 124, is adapted to vary a control pressure responsive to air temperature change and is or may be of a well known type not requiring detailed description. Air from a pressurized source is introduced to the thermostat 116 through a supply conduit 126 and pressurized air may be discharged therefrom and from the control conduit 124 through an appropriate vent conduit 128. It will be apparent that the thermostat may be rendered responsive to the temperature of air discharged by the distribution apparatus as by locating the same in a room or other enclosure served by the apparatus, and it will be further apparent that the respective positions of the valve members 54, 54 may be controlled thereby through operation of the actuator 114 and the linkage means 62 whereby to regulate the temperature of the apparatus discharge air or the temperature of the air in the room or other enclosure in a desired manner.

The invention claimed is:

1. For use in an air distribution system which includes both hot and cold air supply ducts, apparatus comprising a housing within which there is defined an air mixing chamber having a discharge opening and having first and second inlet openings connectible respectively with hot and cold air supply ducts of the air distribution system, hot and cold air proportioning valves operatively associated respectively with and swingably movable toward and away from said first and second inlet openings for regulating the relative amounts of hot and cold air supplied to said mixing chamber from the hot and cold air supply ducts of the distribution system, and means for operating said valves, said valves having a plurality of fins thereon in a generally fan-shaped arrangement to both direct and to broaden and flatten an air stream passing thereover and thence into the mixing chamber, and said fins defining air channels therebetween which increase in depth in the direction of air flow.

2. For use in an air distribution system which includes both hot and cold air supply ducts, apparatus comprising a housing within which there is defined an air mixing chamber having a discharge opening and having first and second inlet openings which are disposed on opposite sides of the chamber and which are connectible respectively with hot and cold air supply ducts of the air distribution system, similar first and second valve members pivotally supported respectively adjacent said first and second inlet openings and adapted to be swung toward and away from their respective inlet openings for closing and opening the same, each of said valve members being provided with air directing fins and said fins and said first and second inlet openings being constructed and arranged so that hot and cold air streams entering said mixing chamber with both valve members open whirl in the chamber in side-by-side relationship but in opposite directions, linkage means connected with said valve members and having an input member which may be moved in one and an opposite direction to effect opening and closing swinging movements of said valve members in unison but in opposite directions, and an actuator having an output member movable in one and an opposite direction operatively connected with the input member of said linkage means.

3. For use in an air distribution system which includes both hot and cold air supply ducts, apparatus comprising a housing within which there is defined an air mixing chamber having a discharge opening and having first and second inlet openings which are disposed on opposite sides of the chamber and which are connectible respectively with hot and cold air supply ducts of the air distribution system, similar first and second valve members pivotally supported respectively adjacent said first and second inlet openings and adapted to be swung toward and away from their respective inlet openings for closing and opening the same, each of said valve members being provided with a plurality of air directing fins which serve to broaden and flatten a stream of air flowing thereby so that the air stream enters the mixing chamber in a fan pattern, and the air directing fins on said first valve member being angularly arranged with respect to the corresponding fins on said second valve member so that a stream of hot air whirls in the mixing chamber in side-by-side relation with an oppositely whirling stream of cold air when both valve members are open, linkage means connected with said valve members and having an input member which may be moved in one end and an opposite direction to effect opening and closing swinging movements of said valve members in unison but in opposite directions, and an actuator having an output member movable in one and an opposite direction operatively connected with the input member of said linkage means.

4. For use in an air distribution system which includes both hot and cold air supply ducts, apparatus comprising a housing within which there is defined an air mixing chamber having a top wall which defines a discharge opening and having a bottom wall which is connected with front and back walls and oppositely facing side walls, said front, back and side walls being connected also with said top wall and said side walls each being provided with an inlet opening, said inlet openings being connectible respectively with hot and cold air supply ducts of the air distribution system, similar first and second valve members pivotally supported respectively adjacent said hot and cold air inlet openings and adapted to be swung toward and away from their respective inlet openings for closing and opening the same, each of said valve members being provided with a plurality of air directing fins which serve to broaden and flatten a stream of air flowing thereby so that the air stream enters the mixing chamber in a fan pattern, and the air directing fins on one of said valve members being arranged to direct the air emitted therefrom in a fan pattern downwardly and rearwardly in the mixing chamber and the corresponding fins on the other of said valve members being arranged to direct the air emitted therefrom in a fan pattern downwardly and forwardly in said mixing chamber whereby hot and cold air streams whirl in the mixing chamber in side-by-side relation but in opposite direction, linkage means connected with said valve members and having an input member which may be moved in one and an opposite direction to effect opening and closing swinging movements of said valve members in unison but in opposite directions, and an actuator having an output member movable in one and an opposite direction operatively connected with the input member of said linkage means.

5. For use in an air distribution system which includes both hot and cold air supply ducts, apparatus comprising a housing within which there is defined an air mixing chamber haivng a top wall which defines a discharge opening and having a bottom wall which is connected with similar front and back walls and with similar oppositely facing side walls which diverge upwardly with respect to each other, said front, back and side walls being connected also with said top wall and said side walls each being provided with a circular inlet opening, said circular inlet openings being connectible respectively with hot and cold air supply ducts and said openings being arranged in their respective walls so that their axes intersect in said mixing chamber, similar first and second valve support members pivotally supported at their upper ends respectively adjacent said hot and said cold air inlet openings and adapted to be swung toward and away from their respective inlet openings, similar circular first and second valve members each provided with a plurality of air directing fins arranged in a fan pattern which serve to broaden and flatten a stream of air flowing thereby and to discharge the air in a fan pattern, said valve members being mounted respectively on said first and second support members so that the air directing fins on one of said valve members are angularly arranged to direct the air flowing thereby downwardly and rearwardly in the mixing chamber and so that the corresponding fins on the other of said valve members are angularly arranged to direct the air flowing thereby downwardly and forwardly in said mixing chamber whereby hot and cold air whirl in the mixing chamber in side-by-side relation but in opposite directions, first and second connecting links in said mixing chamber attached respectively to said first and second valve support members at the lower ends of said members, a bell crank pivotally supported in said mixing chamber and pivotally connected with each of said connecting links, and an actuator having an output member movable in one and an opposite direction pivotally connected with said bell crank so as to swing the same in one and an opposite direction about its pivot to effect swinging movements of said valve support members and opening and closing movements of said valve members relative to said inlet openings in unison but in opposite directions.

References Cited by the Examiner

UNITED STATES PATENTS

| 1,522,120 | 1/25 | Holder | 137—604 X |
| 1,882,966 | 10/32 | Schaffner | 251—117 X |
| 2,813,474 | 11/57 | Kurth | 98—38 |
| 2,831,754 | 4/58 | Manka | 239—404 |
| 2,875,783 | 3/59 | Schippers | 137—625.3 |
| 2,948,210 | 8/60 | Conlon | 98—38 |
| 3,034,725 | 5/62 | Person | 137—607 X |

WILLIAM F. O'DEA, *Primary Examiner.*

UNITED STATES PATENT OFFICE
CERTIFICATE OF CORRECTION

Patent No. 3,211,177                         October 12, 1965

Leonard R. Phillips et al.

It is hereby certified that error appears in the above numbered patent requiring correction and that the said Letters Patent should read as corrected below.

Column 5, lines 31 to 35, strike out "support members 52, 52, the aforementioned locating pins 72, 72 on the said members are entered in locating holes 84, 84 (FIG. 2) formed in said valve support members to effect the annular adjustments of the valve member center lines 82, 82 required to achieve the desired whirling"; column 10, line 1, for "haivng" read -- having --.

Signed and sealed this 31st day of May 1966.

(SEAL)
Attest:

ERNEST W. SWIDER                                        EDWARD J. BRENNER
Attesting Officer                                             Commissioner of Patents